(12) United States Patent (10) Patent No.: US 12,657,955 B2
Cho et al. (45) Date of Patent: Jun. 16, 2026

(54) APPARATUS FOR IDENTIFYING A FACE AND METHOD THEREOF

(71) Applicants: Hyundai Motor Company, Seoul (KR); Kia Corporation, Seoul (KR)

(72) Inventors: Kyung Hwan Cho, Anyang-si (KR); Moon Sub Jin, Yongin-si (KR); Ji Won Kim, Suwon-si (KR); Hyeon Seok Jung, Suwon-si (KR); Keon Ho Lee, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 474 days.

(21) Appl. No.: 18/495,417

(22) Filed: Oct. 26, 2023

(65) Prior Publication Data

US 2024/0378920 A1 Nov. 14, 2024

(30) Foreign Application Priority Data

May 9, 2023 (KR) ........................ 10-2023-0060088

(51) Int. Cl.
| | |
|---|---|
| *G06V 40/16* | (2022.01) |
| *G06V 10/74* | (2022.01) |
| *G06V 10/94* | (2022.01) |
| *G06V 40/50* | (2022.01) |

(52) U.S. Cl.
CPC .......... *G06V 40/172* (2022.01); *G06V 10/761* (2022.01); *G06V 10/955* (2022.01); *G06V 40/165* (2022.01); *G06V 40/171* (2022.01); *G06V 40/50* (2022.01)

(58) Field of Classification Search
CPC .. G06V 40/172; G06V 10/761; G06V 10/955;
G06V 40/165; G06V 40/171; G06V
40/50; G06V 40/161; G06V 40/173;
G06V 10/75; G06V 40/168; G06V 10/62;
G06V 40/103; G06T 7/246; G06T
2207/30201; G06T 2210/12; G06F
16/235; G06F 16/71; G06F 16/784
See application file for complete search history.

(56) References Cited

U.S. PATENT DOCUMENTS

| | | | |
|---|---|---|---|
| 10,140,726 B2 | 11/2018 | Nishino et al. | |
| 2004/0197014 A1* | 10/2004 | Oohashi ................. | G06V 40/16 |
| | | | 382/153 |
| 2019/0371080 A1 | 12/2019 | Sminchisescu et al. | |
| 2021/0312166 A1* | 10/2021 | Yuan ...................... | G06N 3/045 |
| 2022/0165048 A1 | 5/2022 | Ham et al. | |

FOREIGN PATENT DOCUMENTS

| | | |
|---|---|---|
| JP | 6730236 B2 | 7/2020 |
| KR | 101164228 B1 | 7/2012 |
| KR | 101680598 B1 | 12/2016 |
| KR | 102161476 B1 | 10/2020 |
| KR | 102187302 B1 | 12/2020 |
| KR | 102225613 B1 | 3/2021 |
| KR | 102533505 B1 | 5/2023 |

* cited by examiner

*Primary Examiner* — Andrew M Moyer
*Assistant Examiner* — Ahmed A Nasher
(74) *Attorney, Agent, or Firm* — Slater Matsil, LLP

(57) ABSTRACT

Embodiments relate to a face identification apparatus and a method thereof. An exemplary embodiment face identification apparatus includes a processor configured to extract face information and person information from image data and to identify a face using the face information and the person information and a storage configured to store data and algorithms to be driven by the processor.

20 Claims, 9 Drawing Sheets

Face 1                                         Person 1
Face 2                                         Person 2

Face n                                         Person m

| FACE | | PERSON | | MATCHING STATE | ID |
|---|---|---|---|---|---|
| Face Feature | Face Track ID | Person Feature | Person Track ID | | |
| | 1 | | 5 | True | 1 |
| ⁘ | | | | | |

FIG.4

APPARATUS FOR IDENTIFYING A FACE AND METHOD THEREOF

CROSS-REFERENCE TO RELATED APPLICATIONS

This application claims the benefit of Korean Patent Application No. 10-2023-0060088, filed on May 9, 2023, which application is hereby incorporated herein by reference.

TECHNICAL FIELD

The present disclosure relates to a face identification apparatus and a method thereof.

BACKGROUND

Recently, face recognition technology has been commercialized by being applied to various services such as unlocking smartphones, banking, public transportation, convenience stores, and security devices.

Existing face recognition technology compares a face image taken in a field with an already registered image and outputs only a result of whether or not it is a same person.

That is, in the prior art, face recognition performance is low because information related to human facial features is not used during face recognition.

SUMMARY

The present disclosure relates to a face identification apparatus and a method thereof. Particular embodiments relate to a technique for improving accuracy of a face identifying technique.

An exemplary embodiment of the present disclosure provides a face identification apparatus and a method thereof, capable of continuous tracking to accurately identify faces by recognizing a face using face information and person information in response to one of the face information and the person information being lost.

An exemplary embodiment of the present disclosure also provides a face identification apparatus and a method thereof, capable of recognizing a face to minimize misrecognition of a face based on a face person matching table that is continuously updated without similarity comparison of expressor vectors.

In addition, an exemplary embodiment of the present disclosure provides a face identification apparatus and a method thereof, capable of improving re-identification performance by adjusting a face weight and a person weight according to a situation thereof during re-identification.

The technical objects of embodiments of the present disclosure are not limited to the objects mentioned above, and other technical objects not mentioned may be clearly understood by those skilled in the art from the description of the claims.

An exemplary embodiment of the present disclosure provides a face identification apparatus including a processor configured to extract face information and person information from image data and to identify a face using the face information and the person information and a storage configured to store data and algorithms driven by the processor.

In an exemplary embodiment of the present disclosure, the processor may be configured to detect a person area and a face area from the image data, to create a bounding box in the person area and assign a person ID for tracking, and to create a bounding box in the face area and assign a face ID for tracking.

In an exemplary embodiment of the present disclosure, the processor may be configured to determine whether the person ID and the face ID are registered in a face person matching table.

In an exemplary embodiment of the present disclosure, the storage may be configured to store the face person matching table, and the face person matching table is configured to store a face ID, a face expressor, a person ID, a person expressor, and an integrated ID by matching them.

In an exemplary embodiment of the present disclosure, the processor may be configured, in response to a case that the person ID and the face ID are registered in the face person matching table, to identify the face using the IDs registered in the face person matching table.

In an exemplary embodiment of the present disclosure, the processor may be configured, in response to a case that both the face area and the person area are detected in a first frame of the image data but the face area is not detected in a second frame of the image data, to inquire whether the person ID of the person area detected in the second frame is registered in the face person matching table, and in response to a case that the person ID of the person area detected in the second frame is registered in the face person matching table, to identify a face with the corresponding ID.

In an exemplary embodiment of the present disclosure, the processor may be configured to assign a new face ID to a face area that is detected again in a third frame of the image data and to update the face ID registered in the face person matching table to the new face ID.

In an exemplary embodiment of the present disclosure, the processor may be configured, in response to a case that both the face area and the person area are detected in a first frame of the image data but the person area is not detected in a second frame of the image data, to inquire whether the face ID of the face area detected in the second frame is registered in the face person matching table, and in response to a case that the face ID of the face area detected in the second frame is registered in the face person matching table, to identify a face with the corresponding ID.

In an exemplary embodiment of the present disclosure, the processor may be configured to assign a new person ID to a person area that is detected again in a third frame of the image data and to update the person ID registered in the area person matching table to the new face ID.

In an exemplary embodiment of the present disclosure, the processor may be configured, in response to a case that the person ID and the face ID are not registered in the face person matching table, to extract the person information from the person area and to extract the face information from the face area to determine whether the person information and the face information are information of a same person.

In an exemplary embodiment of the present disclosure, the processor may be configured to determine whether the information is of the same person by determining whether a pixel distance difference between a face position extracted from the person information and a face position extracted from the person area is smaller than a predetermined first threshold.

In an exemplary embodiment of the present disclosure, the processor may be configured to determine whether the information is of the same person by determining whether a difference between a distance from a camera to the person area and a distance from the camera to the face area is smaller than a predetermined second threshold.

In an exemplary embodiment of the present disclosure, the processor may be configured to determine whether the information is of the same person by determining whether a size of an overlapped area between bounding boxes of the person area and the face area is greater than a predetermined third threshold.

In an exemplary embodiment of the present disclosure, the processor may be configured, in response to a case that the person information and the face information are determined to be information of the same person, to perform similarity comparison between the extracted person information and the extracted face information and the person information and the face information registered in the face person matching table.

In an exemplary embodiment of the present disclosure, the processor may be configured to perform the similarity comparison by using similarity between a person expressor of the extracted person information and a person expressor of the person information registered in the face person matching table, similarity between a face expressor of the extracted face information and a face expressor of the face information registered in the face person matching table, and a predetermined face weight and a predetermined person weight.

In an exemplary embodiment of the present disclosure, the processor may be configured to increase the face weight and decrease the person weight as a difference between an input time of the face expressor of the extracted face information and a registration time of the face expressor of the face information registered in the face person matching table increases.

In an exemplary embodiment of the present disclosure, the processor may be configured to increase the person weight and decrease the face weight as a distance from a camera to the person area increases.

In an exemplary embodiment of the present disclosure, the processor may be configured to determine whether similarity between the extracted person information and the extracted face information and the person information and the face information registered in the face person matching table is greater than a predetermined similarity threshold.

In an exemplary embodiment of the present disclosure, the processor may be configured to determine that the extracted person information and the extracted face information and the person information and the face information registered in the face person matching table are information of the same person in response to a case that the similarity between the extracted person information and the extracted face information and the person information and the face information registered in the face person matching table is greater than the predetermined similarity threshold, and to newly register the extracted person information and the extracted face information in the face person matching table in response to a case that the similarity between the extracted person information and the extracted face information and the person information and the face information registered in the face person matching table is equal to or smaller than the predetermined similarity threshold.

An exemplary embodiment of the present disclosure provides a face identification method including extracting face information and person information from image data and identifying a face using the face information and the person information.

According to the present embodiment, it is possible to perform continuous tracking to accurately identify a face in response to one information being lost by using face information and person information at the same time.

According to the present embodiment, it is also possible to minimize misrecognition of a face by performing face recognition based on a face person matching table that is continuously updated without similarity comparison of expressor vectors.

In addition, according to the present embodiment, it is possible to improve re-identification performance by adjusting a face weight and a person weight according to a situation thereof during re-identification.

Furthermore, various effects that can be directly or indirectly identified through this document may be provided.

BRIEF DESCRIPTION OF THE DRAWINGS

FIG. 4 illustrates an example view of a face person matching table.

DETAILED DESCRIPTION OF ILLUSTRATIVE EMBODIMENTS

Figure 1:
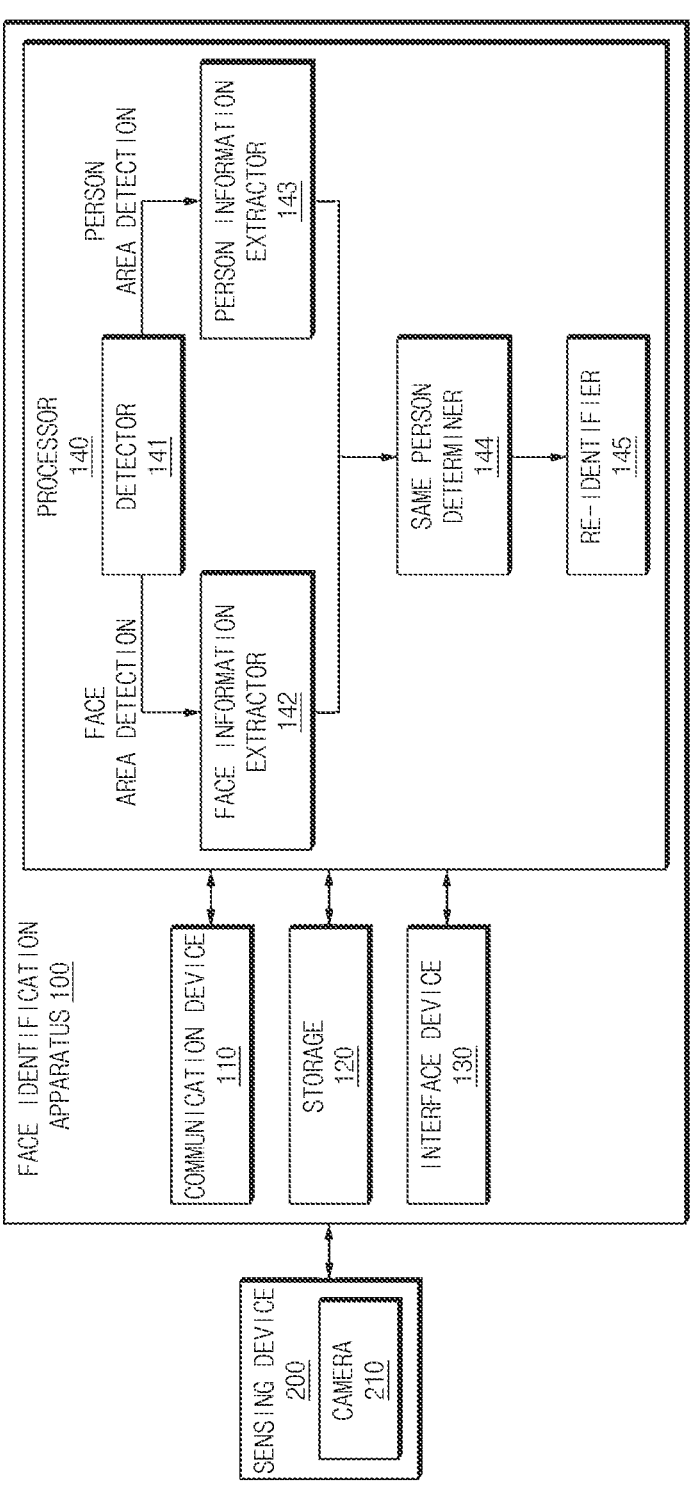
FIG. 1 illustrates a block diagram showing an example configuration of a face identification apparatus.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In describing an exemplary embodiment, when it is determined that a detailed description of the well-known configuration or function associated with the exemplary embodiment may obscure the gist of the exemplary embodiment of the present disclosure, it will be omitted.

In describing constituent elements according to an exemplary embodiment, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an exemplary embodiment of the present disclosure pertains (those skilled in the art) unless they are differently defined. Terms defined in a generally used dictionary shall be construed to have meanings matching those in the context of a related art and shall not be construed to have idealized or excessively formal meanings unless they are clearly defined in the present specification.

Hereinafter, various exemplary embodiments of the present disclosure will be described in detail with reference to FIG. 1 to FIG. 9.

Figure 2:
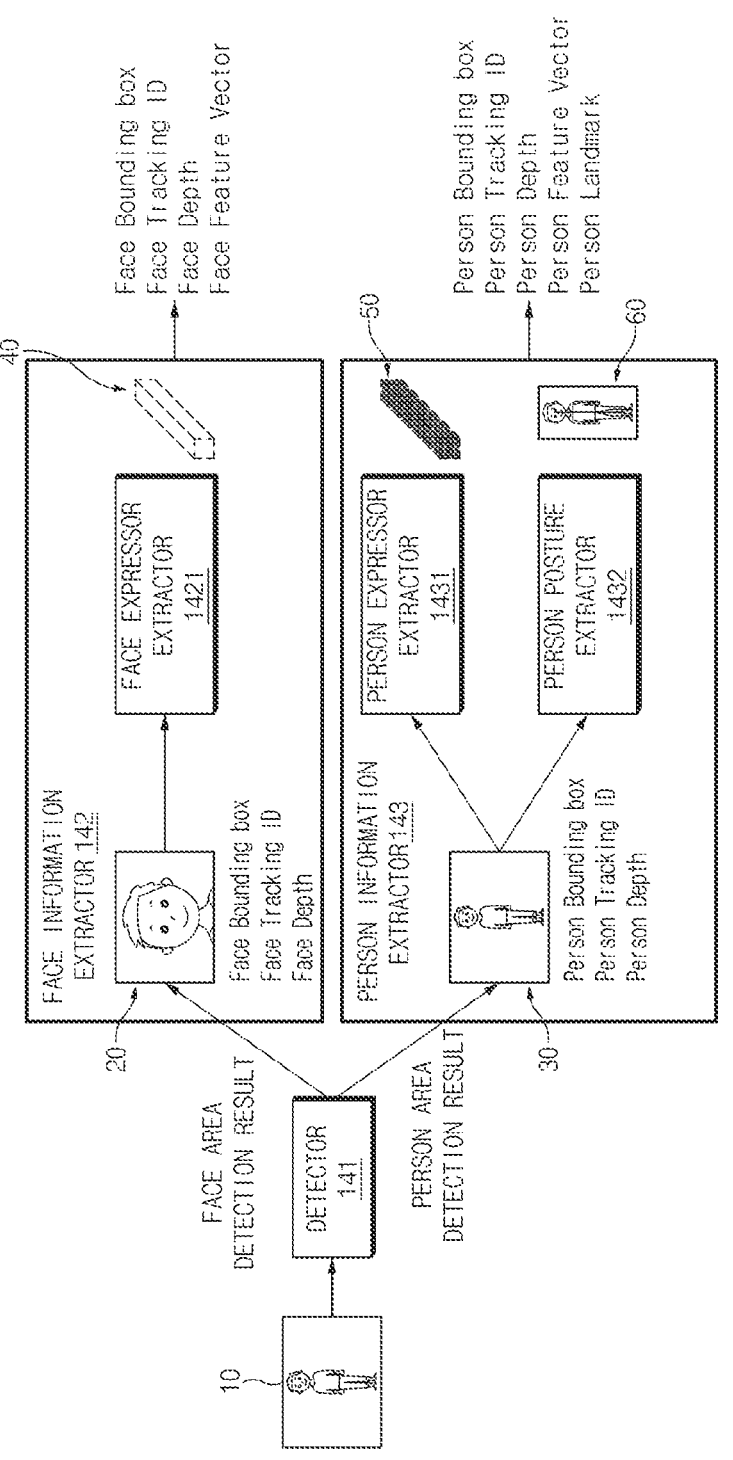
FIG. 2 illustrates a view for describing an example flow of a face identifying process.

FIG. 1 illustrates a block diagram showing an example configuration of a face identifying apparatus, and FIG. 2 illustrates a view for describing an example flow of a face identifying process.

The face identification apparatus 100 according to an exemplary embodiment of the present disclosure may identify a user face from image data inputted through a sensing device 200.

The face identification apparatus 100 may be implemented inside or separately from a system requiring face identification, e.g., a vehicle, a robot, or the like. In addition, the face identification apparatus 100 may be utilized in a surveillance system using a CCTV as well as a robot system.

The face identification apparatus 100 may be integrally formed with internal control units of a system using the apparatus 100, or it may be implemented as a separate hardware device to be connected to control units of the vehicle by a connection means. For example, the face identification apparatus 100 may be implemented integrally with the system, or it may be installed or attached as a separate element of the system.

The face identification apparatus 100 may extract face information and person information from image data, and it may identify a face using the face information and the person information.

The sensing device 200 may include a camera 210 for photographing a user face.

Referring to FIG. 1, the face identification apparatus 100 may include a communication device 110, a storage (i.e., a memory) 120, an interface device 130, and a processor 140.

The communication device 110 is a hardware device implemented with various electronic circuits to transmit and receive signals through a wireless or wired connection, and it may transmit and receive information based on in-system devices and network communication techniques. As an example, the network communication techniques may include controller area network (CAN) communication, local interconnect network (LIN) communication, flex-ray communication, and the like.

In addition, the communication device 110 may perform communication with an external server, infrastructure, other robots, etc. through a wireless Internet access or short range communication technique. Herein, the wireless communication technique may include wireless LAN (WLAN), wireless broadband (Wibro), Wi-Fi, world interoperability for microwave access (Wimax), etc. In addition, the short-range communication technique may include Bluetooth®, ZigBee, ultra wideband (UWB), radio frequency identification (RFID), infrared data association (IrDA), and the like.

As an example, the communication device 110 may receive image data by communicating with the sensing device 200, and it may transmit face identification information identified by the processor 140 to another device using the same. In addition, the communication device 110 may receive camera depth information from the camera 210. In this case, the camera depth information may include a distance from the camera 210 to a person area, a distance from the camera 210 to a face area, and the like.

The storage 120 may store sensing results of the sensing device 200 and data and/or algorithms required for the processor 140 to operate, and the like.

As an example, the storage 120 may store a face person matching table and the like as shown in FIG. 4 to be described later. The face person matching table (FPMT) may include a face feature, a face track ID for face tracking, a person feature, and a person track ID for person tracking by matching them with an integrated ID.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the apparatus 100 and results thereof. Herein, the input means may include a key button, and it may include a mouse, a joystick, a jog shuttle, a stylus pen, and the like. Furthermore, the input means may include a soft key implemented on the display.

The output device may include a display, and it may also include a voice output means such as a speaker. In the instant case, in a response to a case that a touch sensor formed of a touch film, a touch sheet, or a touch pad is provided on the display, the display may operate as a touch screen, and it may be implemented in a form in which an input device and an output device are integrated. In embodiments of the present disclosure, the output device may display a face recognition result and a screen for face registration.

In the instant case, the display may include at least one of a liquid crystal display (LCD), a thin film transistor liquid crystal display (TFT LCD), an organic light emitting diode display (OLED display), a flexible display, a field emission display (FED), a 3D display, or any combination thereof.

The processor 140 may be electrically connected to the communication device 110, the storage 120, the interface device 130, and the like, may electrically control each component, and may be an electrical circuit that executes software commands, thereby performing various data processing and calculations described below.

The processor 140 may process a signal transferred between components of the flight of the face identification apparatus 100 to perform overall control such that each component can perform its function normally. The processor 140 may be implemented in the form of hardware, software, or a combination of hardware and software. For example, the processor 140 may be implemented as a microprocessor, but embodiments of the present disclosure are not limited thereto.

The processor 140 may detect a person area 30 and a face area 20 from the input image data 10, may create a bounding box in the person area 30, may give a person ID for tracking thereto, may create a bounding box in the face area 20, and may give a face ID for tracking thereto.

The person area 30 indicates an area that includes a human shape and is processed as a bounding box from the human shape to a predetermined pixel range, and the face area 20 indicates an area that includes a face shape and is processed as a bounding box from the face shape to a predetermined pixel range.

The person ID and the face ID are IDs for tracking, and assuming that a first frame, a second frame, and a third frame are inputted among inputted image data, may be assigned according to a position of a bounding box of the person area 30 or the face area 20. For example, in response to a case that a bounding box of a person A is positioned in a center of an image and a person ID1 is assigned to the bounding box of the person A in a first frame, the person ID1 may also be assigned to the bounding box located in the center of the image in a second frame 2. As a result, the person ID1 may be continuously tracked.

Accordingly, according to embodiments of the present disclosure, a tracking algorithm is used for object tracking, and the tracking algorithm may include algorithms such as an IOU tracker, a simple online and realtime tracking (SORT), and a deepsort.

The processor 140 may determine whether the person ID and the face ID are registered in the face person matching table (FPMT). In this case, the face person matching table may store a face ID, a face expressor, a person ID, a person expressor, and an integrated ID by matching them (see FIG. 4 later).

The processor 140 may identify a face using an ID registered in the face person matching table in response to a case that the person ID and the face ID are registered in the face person matching table.

The processor 140 detects both the face area 20 and the person area 30 in a first frame of image data, but in response to a case that the face area 20 is not detected in a second frame of the image data, may inquire whether a person ID of the person area 30 detected in the second frame is registered in the face person matching table, and in response to a case that the person ID of the person area 30 detected in the second frame is registered in the face person matching table, may identify a face by using the corresponding ID.

In response to a case that the face area 20 is detected again in a third frame of the image data, the processor 140 may assign a new face ID to the detected face area 20 again to update the face ID registered in the face person matching table to the new face ID.

The processor 140 detects both the face area 20 and the person area 30 in a first frame of image data, but in response to a case in which the person area 30 is not detected in the second frame of the image data, may inquire whether a face ID of the face area 20 detected in the second frame is registered in the face person matching table, and in response to a case in which the face ID of the face area 20 detected in the second frame is registered in the face person matching table, may identify a face by using the corresponding ID.

In response to a case that the person area 30 is detected again in the third frame of the image data, the processor 140 may assign a new person ID to the detected person area 30 again to update the person ID registered in the face person matching table to the new person ID.

In response to a case that the person ID and the face ID are not registered in the face person matching table, the processor 140 may extract person information from the person area 30 and face information from the face area 20 to determine whether the person information and the face information are information of the same person.

The person information includes a person expressor (feature vector) in the person area 30, and the face information includes a face expressor (feature vector) in the face area 20. In this case, the expressor means that image data is expressed as a vector based on a deep learning model.

The processor 140 may determine whether the information belongs to the same person by determining whether a pixel distance difference between a face position extracted from the person information and a face position extracted from the person area 30 is smaller than a first predetermined threshold.

The processor 140 may determine whether the information belongs to the same person by determining whether a difference between a distance from a camera to the person area 30 and a distance from the camera to the face area 20 is smaller than a predetermined second threshold.

In addition, the processor 140 may determine whether the information is of the same person by determining whether a size of an overlapping area of the bounding box of the person area 30 and the bounding box of the face area 20 is greater than a predetermined third threshold.

In response to determining that the person information and the face information are information of the same person, the processor 140 may perform similarity comparison between extracted person information and extracted face information and the person information and the face information registered in the face person matching table.

The processor 140 may perform similarity comparison by using a degree of similarity between a person expressor of the extracted person information and a person expressor of the person information registered in the face person matching table, similarity between a face expressor of the extracted face information and a face expressor of the face information registered in the face person matching table, and a predetermined face weight and a predetermined person weight.

The processor 140 may increase the face weight and decrease the person weight as a difference between an input time of the face expressor of the extracted face information and a registration time of the face expressor of the face information registered in the face person matching table increases.

The processor 140 may increase the person weight and decrease the face weight as a distance from the camera to the person area 30 increases.

The processor 140 may determine whether the similarity between the extracted person information and the extracted face information and the person information and the face information registered in the face person matching table is greater than a predetermined similarity threshold.

In response to a case that the similarity between the extracted person information and the extracted face information and the person information and the face information registered in the face person matching table is greater than the predetermined similarity threshold, the processor 140 may determine that the extracted person information and the extracted face information and the person information and the face information registered in the face person matching table are information of the same person.

In response to a case that the similarity between the extracted person information and the extracted face information and the person information and the face information registered in the face person matching table is equal to or smaller than the predetermined similarity threshold, the processor 140 may newly register the extracted person information and the extracted face information in the face person matching table.

To this end, the processor 140 may include a detector 141, a face information extractor 142, a person information extractor 143, a same person determiner 144, and a re-identifier 145.

Referring to FIG. 2, the detector 141 detects the face area 20 and the person area 30 in image data 10 obtained from the sensing device 200 to create bounding boxes in the detected areas, and the detector 141 tracks bounding box information to assign a face ID and a person ID to the face area 20 and the person area 30, respectively. In this case, tracking of the face area 20 and the person area 30 may be performed separately. In addition, the detector 141 may receive a distance (face depth) from the camera 210 to the face area 20 and a distance (person depth) from the camera 210 to the person area 30 from the camera 210 through the communication device 110. In addition, the detector 141 may estimate the distance (face depth) from the camera 210 to the face area 20 and the distance (person depth) from the camera 210 to the person area 30 using a size of the bounding box and the distance to the camera 210.

According to embodiments of the present disclosure, in FIG. 1 and FIG. 2, in one detector 141, the person area 30 and the face area 20 may be classified into different classes to be detected, and the detector 141 may be divided into a person detector and a face detector.

The face information extractor 142 extracts a face expressor (feature vector) (face information) 40 from the face area 20 detected by the detector 141. Accordingly, the face information extractor 142 may provide a face bounding box, a face tracking ID, face depth information, and a face expressor (face feature vector) to the same person determiner 144.

The person information extractor 143 extracts a person expressor (person feature vector) (person information) 50 and person posture information (person landmark) 60 from the person area 30 detected by the detector 141. Accordingly, the person information extractor 143 may provide a person bounding box, a person tracking ID, person depth information, a person expressor (person feature vector), and a person landmark to the same person determiner 144.

In this case, an RGB image is expressed as a vector by using a deep learning model to identify a face or a person. In learning a deep learning model, same persons are gathered in close proximity on a vector space, and others are trained to be positioned far away, and these feature vectors are called expressors (feature vectors). The person posture information 60 may include positions of ears, eyes, nose, and each joint of a human on the image data.

Figure 3:
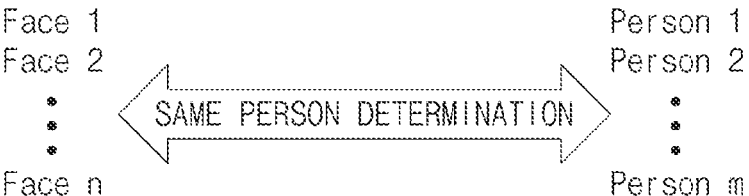
FIG. 3 illustrates a view for describing a process of determining a same person using person information and face information.

The same person determiner 144 may determine whether the face information extracted from the face extractor 142 and the person information extracted from the person information extractor 143 indicate a same person. As illustrated in FIG. 3, in response to a case that there are n pieces of face information and m pieces of detected person information, a process of determining whether all n faces and all m persons indicate a same person is performed. FIG. 3 illustrates a view for describing a process of determining a same person using person information and face information.

The same person determiner 144 may determine whether the following three conditions are satisfied in order to determine whether the person information and the face information indicate the same person.

First, the same person determiner 144 determines whether a pixel distance between a face position extracted by the person information extractor 143 and a face position extracted by the detector 141 is smaller than a predetermined threshold Thr_1 to determine whether or not they are identical (condition 1). In this case, the face position extracted by the person information extractor 143 includes an average position of face areas (ears, eyes, and nose) among person position information (person landmarks), and the face position extracted by the detector 141 may include a center position of a face bounding box of the face area 20.

In addition, the same person determiner 144 may determine whether a difference between a distance (person depth) from the camera 210 to a person and a distance (face depth) from the camera 210 to a face is smaller than a predetermined threshold Thr_2 to determine whether or not they are identical (condition 2).

In this case, the difference between the distance from the camera 210 to the person and the distance from the camera

210 to the face may be obtained from the camera 210, or it may be estimated based on a deep learning algorithm using a size of the bounding box.

Figure 5:
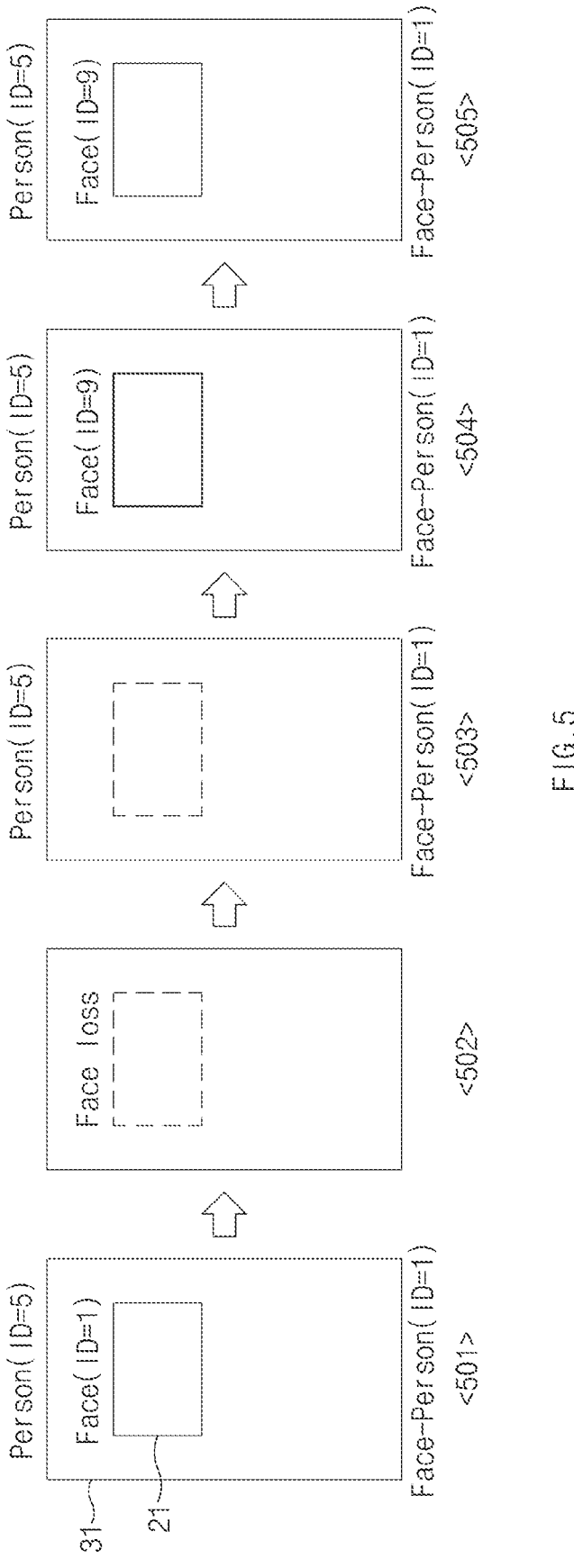
FIG. 5 illustrates a view for describing a face identifying process in response to a case that face information is lost.

In addition, the same person determiner 144 may determine whether a size area of an overlapped area of the bounding box of the person area 30 and the bounding box of the face area 20 is greater than a predetermined threshold Thr_3 to determine whether they are identical (condition 3). In this case, as illustrated in FIG. 5 to be described later, the bounding box 31 of the person area 30 and the bounding box 21 of the face area 20 may overlap for a same person and may not overlap for non-identical persons. In addition, the same person determiner 144 may determine whether the size area of the overlapped area of the bounding box of the person area 30 and the bounding box of the face area 20, and it may compare the size with the threshold Thr_3 to determine whether the same person is indicated. In this case, the threshold Thr_1, the threshold Thr_2, and the threshold Thr_3 may be predetermined by an experimental value to be stored in the storage 120.

The same person determiner 144 may determine that the corresponding face information and person information indicate the same person in response to a case that all three conditions are satisfied. In this case, priority of conditions may be determined in an order of conditions 1, 2, and 3, and the priorities may be changed according to circumstances or some of the three conditions may be used.

In response to a case that the corresponding face information and person information indicate the same person, the same person determiner 144 registers the face information expressor (face feature), a face tracking ID (e.g., 1), a person information expressor (person feature), and a person tracking ID (e.g., 5) by matching them as an integrated ID (e.g., 1). Accordingly, continuous tracking and re-identification is possible by utilizing information registered in the face person matching table.

The re-identifier 145 may identify a face from image data using the face person matching table.

FIG. 5 illustrates a view for describing a face identifying process in response to a case that face information is lost. In this case, the case that the face information is lost may include a case where a person turns around and the person is detected but the face is not detected and the like.

Referring to a view 501 of FIG. 5, the face identification apparatus 100 maps face ID=1 and person ID=5 determined to indicate a same person and assigns an integrated ID (Face-Person ID=1) to register it in a face person matching table (FPMT). In this case, in response to a case that the person information and the face information indicate the same person, a bounding box 31 of the person area and a bounding box 21 of the face area may be overlapped and displayed.

Thereafter, in response to a case that the face information is lost for face ID=1 as in a view 502, the face identification apparatus 100 loses the face ID but has the person ID (Person=5) as in a view 503, and thus it can be seen that the integrated ID is Face-Person ID=1 based on the information registered in the face person matching table (FPMT).

In addition, as illustrated in a view 504, in response to a case that a face is recognized again later (e.g., a case that the face is not detected at first, but the face is turned toward the camera 210 and the face is detected again), the face ID is changed (e.g., face ID=9).

Accordingly, as illustrated in a view 505, the face identification apparatus 100 determines whether new face information (face ID=9) and the person information (person ID=5) indicate a same person, and in response to a case that the new face information (face ID=9) and the person information (person ID=5) are determined to indicate the same person, matches the changed face information (face ID=9) with the person information (person ID=5) to assign the integrated ID (Face-Person ID=1), and updates the face person matching table (FPMT). That is, the face identification apparatus 100 updates the new face information (face ID=9) to the person information (person ID=5).

Figure 6:
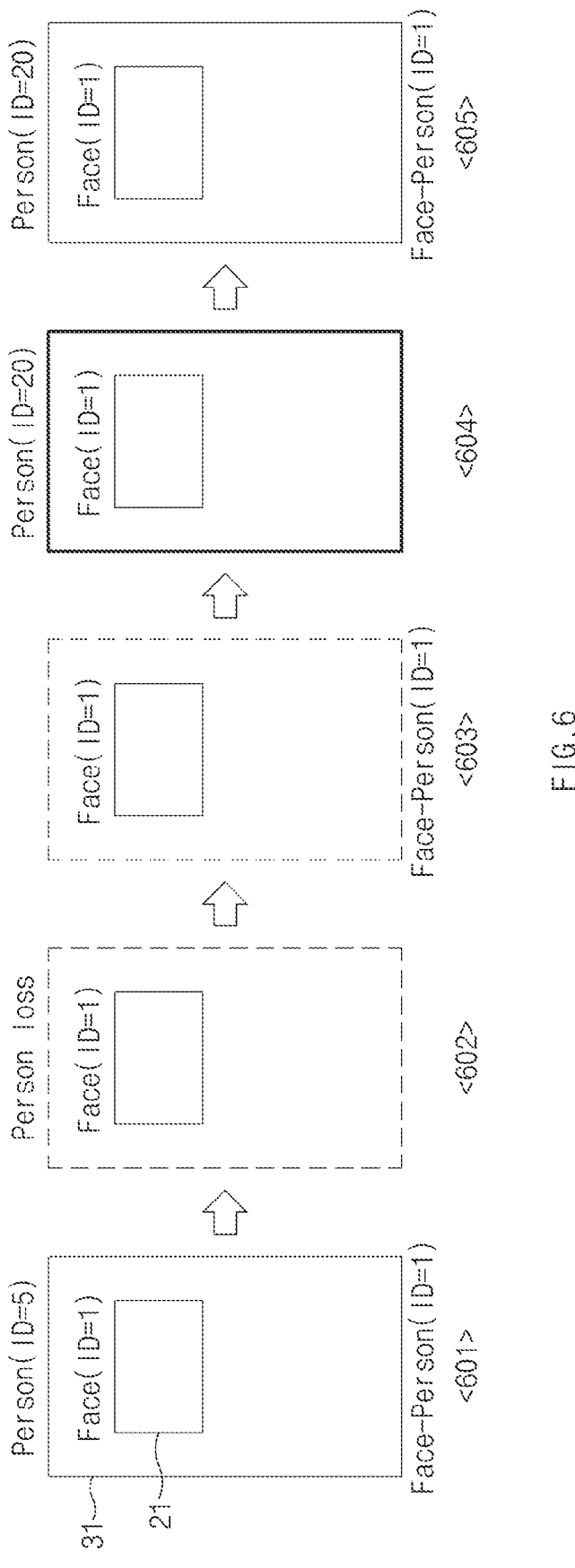
FIG. 6 illustrates a view for describing a face identifying process in response to a case that person information is lost.

FIG. 6 illustrates a view for describing a face identifying process in response to a case that person information is lost. In this case, the case that the person information is lost may include a case where only the face is shown because an obstacle covers the person.

Referring to a view 601 of FIG. 6, the face identification apparatus 100 maps face ID=1 and person ID=5 determined to indicate a same person and assigns an integrated ID (Face-Person ID=1) to register it in a face person matching table (FPMT).

Thereafter, in response to a case that the person information is lost for person ID=5 as in a view 602, the face identification apparatus 100 has lost the person ID but has the face ID (Face ID=1) as in a view 603, and thus it can be seen that the integrated ID is Face-Person ID=1 based on the information registered in the face person matching table (FPMT).

In response to a case that a person is recognized later, as in a view 604 (e.g., a case that an obstacle passes and the person is detected again), the face identification apparatus 100 determines whether newly detected person information (person ID=20) and face information (face ID=1) indicate a same person, and in response to a case that the newly detected person information (person ID=20) and the face information (face ID=1) are determined to indicate the same person, matches the changed person information (person ID=20) with the existing face information (face ID=1) to assign an integrated ID (Face-Person ID=1), and updates it in the face person matching table (FPMT).

Figure 7:
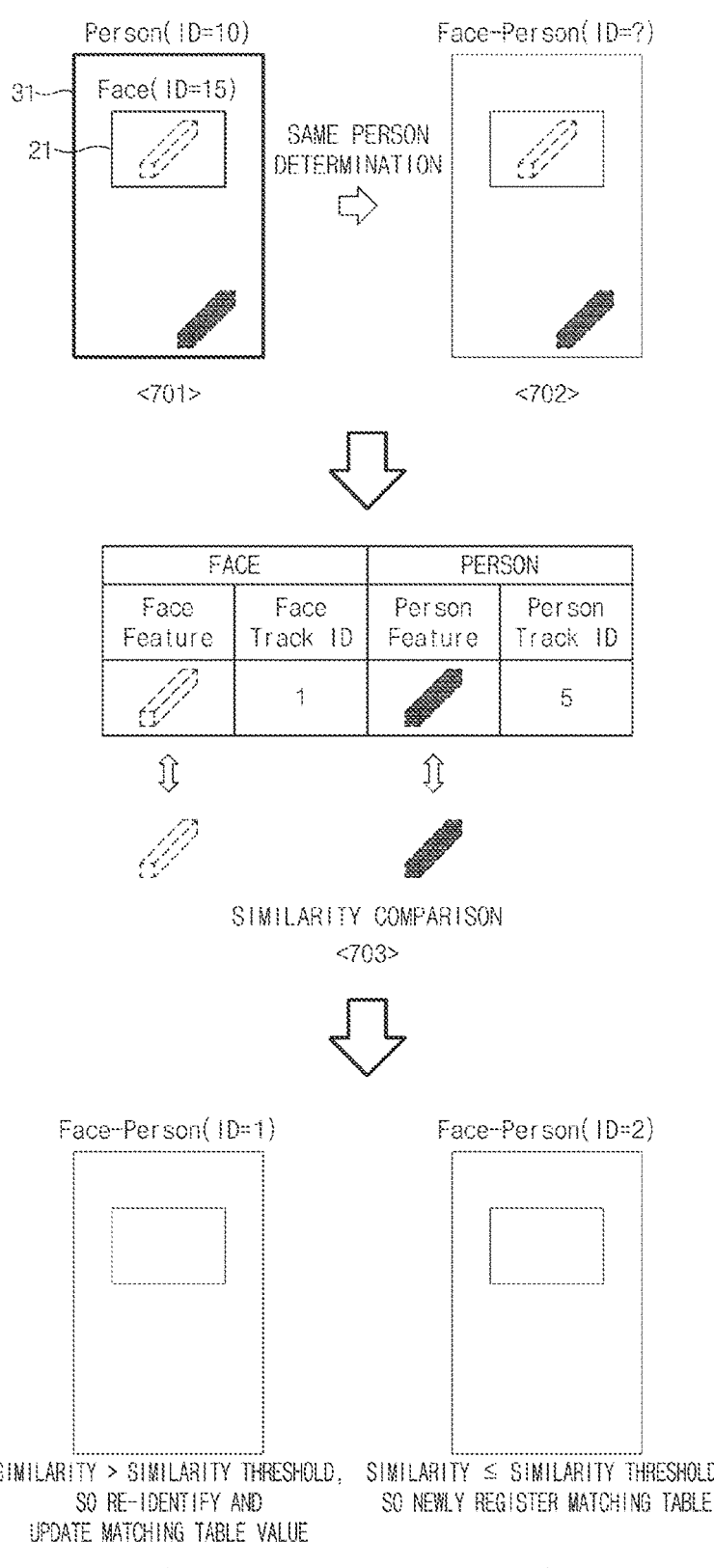
FIG. 7 illustrates a view for describing a face identifying process in response to a case that both person information and face information are lost.

FIG. 7 illustrates a view for describing a face identifying process in response to a case that both person information and face information are lost. In this case, the case in which both the person information and the face information are lost may include a case in which the person information and the face information are not obtained because the person temporarily moves out of the angle of the camera 210 while the person information and the face information are continuously acquired.

Referring to FIG. 7, in response to a case that new person information and new face information are detected, the face identification apparatus 100 determines whether the new person information and the new face information indicate the same person using the above three conditions. As in a view 701, for example, it is assumed that face ID=15 of the new face information and person ID=10 of the new person information.

In response to a case that the new face information (face ID=15) and the new person information (person ID=10) indicate the same person as in a view 702, the face identification apparatus 100 determines whether corresponding ID information (face ID=15, person ID=10) is registered in the face person matching table.

In response to a case that corresponding ID information (face ID=15 and person ID=10) is registered in the face person matching table, the face identification apparatus 100 completes face identification with the registered ID.

On the other hand, in response to a case that the ID information (face ID=15 and person ID=10) is not registered in the face person matching table, the face identification apparatus 100 performs similarity comparison between an expressor of the new person information and an expressor of the new face information and an expressor of the person information and an expressor of the face information registered in a face person matching table as in a view 703.

That is, the face identification apparatus 100 performs similarity comparison between the expressor of the new person information and the expressor of the new face information and expressors of all person information and expressors of all face information registered in the face person matching table.

$$\text{Similarity=face weight*face similarity+person weight*person similarity} \qquad \text{Equation 1:}$$

The face similarity and the person similarity may be calculated as in Equation 2 below.

Equation 2:

$$\text{Similarity} = S_c(A, B) = \cos(\theta) := \frac{A \times B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

$S_c(A, B)$ is cosine similarity of A and B.

In the face similarity, A indicates a face descriptor pre-registered in the face person matching table, and B indicates a face descriptor extracted from new face information. In the person similarity, A indicates a person expressor previously registered in the face person matching table, and B indicates a person expressor extracted from new person information.

In this case, a sum of the face weight and the person weight may be 1, and recognition performance may be improved by adjusting a weight according to a situation thereof.

For example, as a difference between a registration time of face information already registered in the face person matching table and an input time of the newly input face information increases, the face weight may be increased and the person weight may be decreased. This is because a person's appearance is likely to change over time.

In addition, as a distance from the person increases, the person weight increases and the face weight decreases. This is because as the distance increases, the face becomes smaller, making it difficult to identify.

Referring to a view 704, in response to a case that there is a new face person information and an ID whose similarity with the face information is greater than a threshold among the IDs registered in the face person matching table, the face identification apparatus 100 determines that the new person information and the new face information are information of the same person as that of the corresponding ID registered in the face person matching table and matches the new person information and the new face information to the corresponding ID determined to be the same person to update it in the face person matching table (FPMT).

On the other hand, referring to a view 705, in response to a case that there is no ID that is greater than a similarity threshold among the IDs registered in the face person matching table, the face identification apparatus 100 assigns a new integrated ID to the new face information and the person information to register them in the face person matching table (FPMT).

In this case, the similarity threshold may be pre-determined by an experimental value to be stored in the storage 120.

Figure 8:
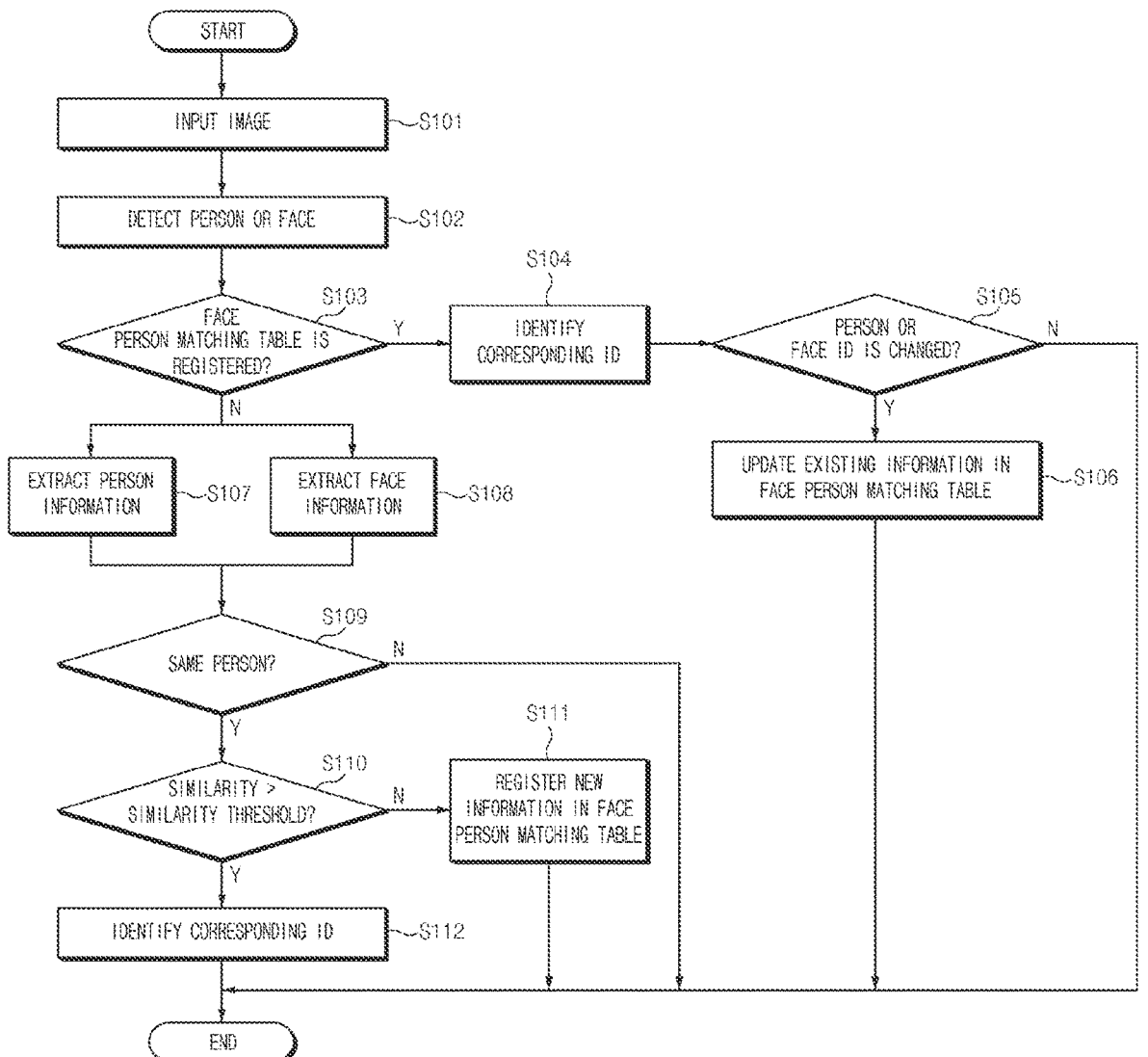
FIG. 8 illustrates a flowchart showing an example face identification method.

Hereinafter, a face identification method according to an exemplary embodiment of the present disclosure will be described with reference to FIG. 8. FIG. 8 illustrates a flowchart showing an example face identification method.

Hereinafter, it is assumed that the face identification apparatus 100 of FIG. 1 performs a process of FIG. 8. In addition, in the description of FIG. 8, operations described as being performed by a device may be understood as being controlled by the processor 140 of the face identification apparatus 100.

Referring to FIG. 8, in response to a case where image data is inputted from the camera 210 or the like (S101), the face identification apparatus 100 detects the person area 30 and the face area 20 from the image data (S102). In this case, the face identification apparatus 100 creates bounding boxes in the person area 30 and the face area 20, respectively, and assigns a person ID and a face ID for tracking.

The face identification apparatus 100 determines whether the person ID and the face ID of the person area 30 and the face area 20 belong to the persons ID and the faces ID registered in the face person matching table (S103). In response to a case that the IDs of the person area 30 and the face area 20 are registered in the face person matching table in step S103, the corresponding ID is identified (S104).

Subsequently, the face identification apparatus 100 determines whether a change of the person ID or face ID has occurred (S105). That is, in response to a case that the face area or the person area is not detected temporarily and then is detected again, the face identification apparatus 100 determines that the person ID and the face ID of the re-detected person area or face area have been changed.

In response to a case that a change of the person ID or face ID occurs in this way, existing information stored in the face person matching table is updated (S106). For example, in response to a case that the person ID is changed to 9 in a state in which the person ID, face ID, and integrated ID are stored in the face person matching table as 1, 2, and 3, respectively, they are updated to Person ID=9, Face ID=2, Integrated ID=3.

On the other hand, in response to a case that the IDs of the person area 30 and the face area 20 are not registered in the face person matching table in step S103, the face identification apparatus 100 respectively extracts person information (including posture information) and face information from the detected person area 30 and face area 20 (S107 and S108).

Subsequently, the face identification apparatus 100 determines whether unregistered person information and face information are information of the same person (S109). The face identification apparatus 100 determines that the unregistered person information and face information are information of the same person in response to a case that all three conditions for determining the same person are satisfied.

In response to a case that the information is not of the same person, the face identification apparatus 100 may terminate the current process and perform the process from step S101 again.

On the other hand, in response to determining that the information is of the same person, the face identification apparatus 100 performs similarity comparison between an expressor of new person information and an expressor of new face information and the expressor of the person information and the expressor of the face information stored in the face person matching table. In this case, similarity comparison may be determined as in Equation 1 and Equation 2 described above.

The face identification apparatus 100 determines whether the similarity is greater than a predetermined similarity threshold (S110), and in response to a case that the similarity is greater than the predetermined similarity threshold, identifies an integrated ID having a similarity greater than a predetermined similarity threshold as the corresponding integrated ID (S112). That is, the face identification apparatus 100 recognizes new person information and new face information as a person (face) of the corresponding integrated ID.

On the other hand, in response to a case that there is no ID whose similarity is greater than the similarity threshold, the face identification apparatus 100 determines that there is no same person and newly assigns and registers new person information and face information as new information as an integrated ID in the face person matching table (S111).

As such, according to embodiments of the present disclosure, it is determined whether a person is already registered in the face person matching table by using a person ID and a face ID assigned to a person area and a face area before extracting person information and face information, and in response to a case that the person is already registered, it makes it possible to quickly identify a face without need to extract the person information and the face information.

In addition, according to embodiments of the present disclosure, in response to a case that the person is not already registered in the face person matching table using the person ID and the face ID assigned to the person area and the face area before, it is determined whether the person information and the face information are information of the same person by extracting person information and face information, in response to a case that they are information of the same person, even though the person is not already registered in the face person matching table, it is determined once again whether the person is already registered in the face person matching table by performing similarity comparison between a face expressor and a person expressor.

Accordingly, in response to a case that there is an ID that matches new face information and person information among people registered in the face person matching table through similarity determination, face recognition accuracy may be further increased by identifying a person (face) of the corresponding ID.

Steps S107 to S112 describe an embodiment in which the face area and the person area are not registered in the face person matching table (FPMT), but even though the face area and person area are registered in the face person matching table (FPMT), a face may be identified through the above steps S107 to S112 in response to a case that the face area and person area are temporarily not extracted.

As such, tracking may be lost in response to a case that either face information or person information is lost in a state in which face identification is performed using the face information or the person information, but according to embodiments of the present disclosure, even though one of the face information and the person information is lost, continuous tracking may be performed to increase face identification accuracy by performing the face identification using both the face information and the person information.

Steps S107 to S112 describe an exemplary embodiment in which the face area and the person area are not registered in the face person matching table (FPMT), but even though the face area and the person area are registered in the face person matching table (FPMT), a face may be identified through the above steps S107 to S112 in response to a case that the face area and person area are temporarily not extracted.

In addition, according to the present embodiment, in response to comparing similarities, it is possible to improve face re-identification performance by adjusting a face weight and a person weight according to a situation thereof.

In addition, according to embodiments of the present disclosure, it is possible to improve face identification performance by continuously updating the face person matching table (FPMT).

In addition, according to embodiments of the present disclosure, in response to a case that a detector detects a face area and a person area, positions of the face area and the person area may be grasped, thereby increasing accuracy of determining whether they indicate a same person.

Figure 9:
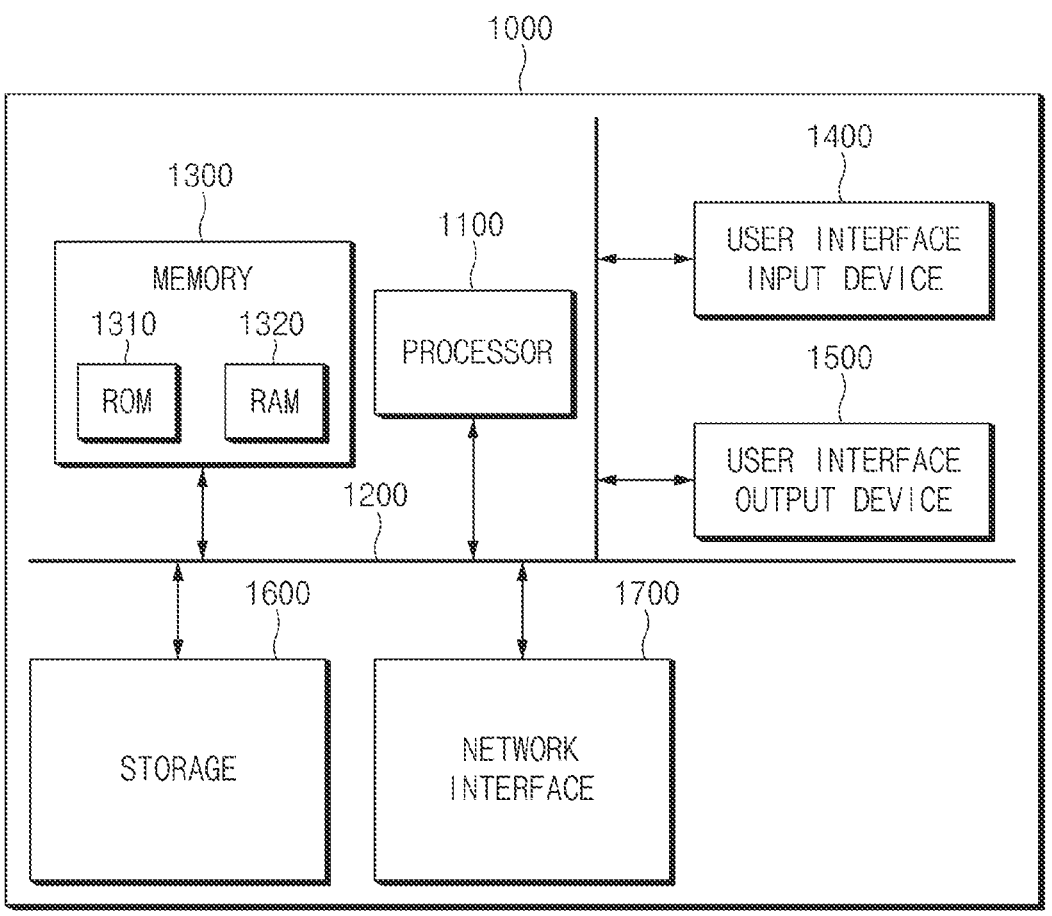
FIG. 9 illustrates an example computing system.

FIG. 9 illustrates an example computing system.

Referring to FIG. 9, the computing system 1000 includes at least one processor 1100, a memory 1300, a user interface input device 1400, a user interface output device 1500, a storage (i.e., a memory) 1600, and a network interface 1700 connected through a bus 1200.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of embodiments of the present disclosure, and those skilled in the art to which the present disclosure pertains may make various modifications and variations without departing from the essential characteristics of the embodiments of the present disclosure.

Therefore, the exemplary embodiments disclosed in the present disclosure are not intended to limit the technical ideas of the embodiments of the present disclosure, but to explain them, and the scope of the technical ideas of the embodiments of the present disclosure is not limited by these exemplary embodiments. The protection range of the embodiments of the present disclosure should be interpreted by the claims below, and all technical ideas within the equivalent range should be interpreted as being included in the scope of the embodiments of the present disclosure.

What is claimed is:

1. A face identification apparatus comprising:
a processor configured to:
extract face information and person information from image data to identify a face using the face information and the person information;
detect a person area and a face area from the image data;

create a first bounding box in the person area and assign a person ID for tracking;
create a second bounding box in the face area and assign a face ID for tracking; and
determine whether the person ID and the face ID are registered in a face person matching table; and
a storage configured to:
store data and algorithms to be driven by the processor;
store the face person matching table, wherein the face person matching table is configured to store the face ID, a face expressor, the person ID, a person expressor, and an integrated ID.

2. The apparatus of claim 1, wherein, in response to a case that the person ID and the face ID are registered in the face person matching table, the processor is configured to identify the face using the IDs registered in the face person matching table.

3. The apparatus of claim 2, wherein the processor is configured to:
in response to a case that both the face area and the person area are detected in a first frame of the image data but the face area is not detected in a second frame of the image data, inquire whether the person ID of the person area detected in the second frame is registered in the face person matching table; and
in response to a case that the person ID of the person area detected in the second frame is registered in the face person matching table, identify a face with a corresponding ID.

4. The apparatus of claim 3, wherein the processor is configured to:
assign a new face ID to the face area that is detected again in a third frame of the image data; and
update the face ID registered in the face person matching table to the new face ID.

5. The apparatus of claim 2, wherein the processor is configured to:
in response to a case that both the face area and the person area are detected in a first frame of the image data but the person area is not detected in a second frame of the image data, inquire whether the face ID of the face area detected in the second frame is registered in the face person matching table; and
in response to a case that the face ID of the face area detected in the second frame is registered in the face person matching table, identify a face with a corresponding ID.

6. The apparatus of claim 5, wherein the processor is configured to:
assign a new person ID to the person area that is detected again in a third frame of the image data; and
update the person ID registered in the face person matching table to the new person ID.

7. A face identification apparatus, the apparatus comprising:
a processor configured to:
extract face information and person information from image data;
identify a face using the face information and the person information;
detect a person area and a face area from the image data;
create a first bounding box in the person area and assign a person ID for tracking;
create a second bounding box in the face area and assign a face ID for tracking;

determine whether the person ID and the face ID are registered in a face person matching table; and in response to a determination that the person ID and the face ID are not registered in the face person matching table, extract the person information from the person area and extract the face information from the face area to determine whether the person information and the face information are information of a same person; and a storage configured to:

store data and algorithms to be driven by the processor; and store the face person matching table, wherein the face person matching table is configured to store the face ID, a face expressor, the person ID, a person expressor, and an integrated ID.

8. The apparatus of claim 7, wherein the processor is configured to determine whether the information is of the same person by determining whether a pixel distance difference between a face position extracted from the person information and a face position extracted from the person area is smaller than a predetermined first threshold.

9. The apparatus of claim 8, wherein the processor is configured to determine whether the information is of the same person by determining whether a difference between a distance from a camera to the person area and a distance from the camera to the face area is smaller than a predetermined second threshold.

10. The apparatus of claim 9, wherein the processor is configured to determine whether the information is of the same person by determining whether a size of an overlapped area between the first bounding box of the person area and the second bounding box of the face area is greater than a predetermined third threshold.

11. The apparatus of claim 7, wherein in response to a case that the person information and the face information are determined to be information of the same person, the processor is configured to perform a similarity comparison between the extracted person information and the extracted face information and the person information and the face information registered in the face person matching table.

12. The apparatus of claim 11, wherein the processor is configured to perform the similarity comparison by using similarity between the person expressor of the extracted person information and the person expressor of the person information registered in the face person matching table, similarity between the face expressor of the extracted face information and the face expressor of the face information registered in the face person matching table, and a predetermined face weight and a predetermined person weight.

13. The apparatus of claim 12, wherein the processor is configured to increase the face weight and decrease the person weight as a difference between an input time of the face expressor of the extracted face information and a registration time of the face expressor of the face information registered in the face person matching table increases.

14. The apparatus of claim 12, wherein the processor is configured to increase the person weight and decrease the face weight as a distance from a camera to the person area increases.

15. The apparatus of claim 12, wherein the processor is configured to determine whether similarity between the extracted person information and the extracted face information and the person information and the face information registered in the face person matching table is greater than a predetermined similarity threshold.

16. The apparatus of claim 15, wherein the processor is configured to:

determine that the extracted person information and the extracted face information and the person information and the face information registered in the face person matching table are information of the same person in response to a case that the similarity between the extracted person information and the extracted face information and the person information and the face information registered in the face person matching table is greater than the predetermined similarity threshold; and newly register the extracted person information and the extracted face information in the face person matching table in response to a case that the similarity between the extracted person information and the extracted face information and the person information and the face information registered in the face person matching table is equal to or smaller than the predetermined similarity threshold.

17. A face identification method, the method comprising:

extracting face information and person information from image data;

detecting a person area and a face area from the image data;

creating a first bounding box in the person area and assigning a person ID for tracking;

creating a second bounding box in the face area and assigning a face ID for tracking;

determining whether the person ID and the face ID are registered in a face person matching table, wherein the face person matching table stores the face ID, a face expressor, the person ID, a person expressor, and an integrated ID, and wherein the face person matching table is stored in a storage; and identifying a face using the face information, the person information, and information stored in the face person matching table.

18. The method of claim 17, further comprising identifying the face using the IDs registered in the face person matching table in response to determining that the person ID and the face ID are registered in the face person matching table.

19. The method of claim 18, further comprising:

determining whether both the face area and the person area are detected in a first frame of the image data but the face area is not detected in a second frame of the image data;

inquiring whether the person ID of the person area detected in the second frame is registered in the face person matching table in response to determining that both the face area and the person area are detected in the first frame but the face area is not detected in the second frame; and identifying a face with a corresponding ID in response to the person ID of the person area detected in the second frame being registered in the face person matching table.

20. The method of claim 19, further comprising:

assigning a new face ID to the face area that is detected again in a third frame of the image data; and updating the face ID registered in the face person matching table to the new face ID.

* * * * *